United States Patent
Helmick et al.

(10) Patent No.: US 11,616,767 B2
(45) Date of Patent: Mar. 28, 2023

(54) STORAGE SYSTEM WITH ENCRYPTED DATA STORAGE DEVICE TELEMETRY DATA

(71) Applicant: Western Digital Technologies, Inc., San Jose, CA (US)

(72) Inventors: Daniel Helmick, Broomfield, CO (US); Timothy Hallett, Oronoco, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 111 days.

(21) Appl. No.: 17/182,698

(22) Filed: Feb. 23, 2021

(65) Prior Publication Data
US 2022/0200968 A1    Jun. 23, 2022

Related U.S. Application Data

(60) Provisional application No. 63/126,715, filed on Dec. 17, 2020.

(51) Int. Cl.
*H04L 9/40* (2022.01)
*G06F 11/30* (2006.01)
*H04L 9/08* (2006.01)

(52) U.S. Cl.
CPC ........ *H04L 63/045* (2013.01); *G06F 11/3037* (2013.01); *H04L 9/0822* (2013.01)

(58) Field of Classification Search
CPC .. H04L 63/045; H04L 9/0822; G06F 11/3037; G06F 21/6209; G06F 11/3034; G06F 11/3409; G06F 11/3476
See application file for complete search history.

(56) References Cited

U.S. PATENT DOCUMENTS

| | | | |
|---|---|---|---|
| 7,571,321 B2 * | 8/2009 | Appenzeller | H04L 9/0861 |
| | | | 713/171 |
| 2013/0283039 A1 * | 10/2013 | Jevans | H04L 63/0435 |
| | | | 713/153 |
| 2018/0062988 A1 * | 3/2018 | Sikaria | H04L 12/4633 |
| 2018/0074973 A1 | 3/2018 | Chan et al. | |
| 2019/0052463 A1 | 2/2019 | O'Hare et al. | |
| 2020/0202017 A1 * | 6/2020 | Parry | H04L 9/302 |
| 2020/0334135 A1 * | 10/2020 | Bragdon | G06F 11/3419 |
| 2021/0303443 A1 * | 9/2021 | McConnell | G06F 21/46 |

OTHER PUBLICATIONS

International Search Report and Written Opinion for International Application No. PCT/US2021/031981, dated Aug. 30, 2021, 8 pgs.
Unknown, Benefits of Self-Encrypting Drives (SEDs), Encryption, Authentication, and Sanitization of SSDs, White Paper, Virtium, 2016, Rancho Santa Margarita, CA (8 pages).

* cited by examiner

*Primary Examiner* — Henry Tsang
(74) *Attorney, Agent, or Firm* — Patent Law Works LLP

(57) ABSTRACT

Systems and methods for encrypted storage device telemetry data are described. Storage device telemetry data may be collected for a telemetry message, such as a non-volatile memory express (NVMe) telemetry command, and encrypted using a first encryption key. The first encryption key may be encrypted using one or multiple second encryption keys and the encrypted first encryption key may be added to the telemetry message. A client system may receive the telemetry message, decrypt the encrypted first encryption key, and use the first encryption key to decrypt the encrypted storage device telemetry data.

20 Claims, 8 Drawing Sheets

STORAGE SYSTEM WITH ENCRYPTED DATA STORAGE DEVICE TELEMETRY DATA

TECHNICAL FIELD

The present disclosure generally relates to data storage device telemetry data and, more particularly, to encrypting data storage device telemetry data for communication to one or more client systems.

BACKGROUND

Storage systems utilize multiple discrete data storage devices, such as solid-state drives, hard disk drives, hybrid drives, tape drives, etc., for storing large quantities of data on behalf of a host. These storage systems may vary from single data storage devices directly supporting a host system through a peripheral storage interface to multi-device storage systems (often supporting multiple host systems) that include multiple data storage devices arranged in an array of drives interconnected by a common communication fabric and, in many cases, controlled by a storage controller, redundant array of independent disks (RAID) controller, or general controller, for coordinating storage and system activities across the array of drives.

In some systems, each data storage device may collect various types of operational data, such as workload data, error data, debug data, event logs, firmware management data, etc. While that data may support a variety of internal storage management functions for the individual storage device, some or all of it may be useful to host or client systems, particularly when those systems utilize or manage a large number of storage devices and data input/output operations, such as large-scale distributed storage systems. Some storage devices may support one or more protocols for sharing operational data with one or more other systems, such as host or client systems, through telemetry data, i.e. data for remotely monitoring the storage devices. For example, storage devices supporting non-volatile memory express (NVMe) protocols may include a telemetry command for providing NVMe logs and/or self-monitoring and reporting technology (SMART) logs to host or client systems over a storage and/or fabric interface.

In some storage systems, multiple users, owners, and/or manufacturers may be involved in the deployment, use, management, and maintenance of the storage system. For example, a storage device manufacturer may sell storage devices that are integrated into a server, storage arrays, and other computing devices. The servers and storage arrays may, in turn, be integrated into a distributed storage system that supports cloud applications for still other users. Any party in this chain, from storage device manufacturers to storage system original equipment manufacturers (OEMs) to storage system customers to end users, may have an interest in telemetry data and its monitoring, aggregation, and analysis. However, not all telemetry data may be appropriate for all parties and one or more parties may implement proprietary telemetry data and/or telemetry data that may expose underlying proprietary configuration or usage data of the storage devices or systems in which they operate. While these systems may be internally secure through system-level security and data encryption and/or support host data security at rest and/or in transit through various encryption protocols, telemetry data may be exposed to various parties with legitimate access to the system.

Encrypted telemetry data that prevents unauthorized parties from accessing telemetry data may be advantageous. An effective way of coordinating and enforcing the secure telemetry data access privileges of various parties may be needed.

SUMMARY

Various aspects for encrypting data storage device telemetry data, particularly formatting telemetry messages with multi-layer encryption, are described.

One general aspect includes a system including and encryption engine and a message handler. The encryption engine is configured to: receive storage device telemetry data; encrypt, using a first encryption key, the storage device telemetry data; and encrypt, using a second encryption key, the first encryption key. The message handler is configured to format a telemetry message, where the telemetry message includes the encrypted storage device telemetry data and the encrypted first encryption key based on the second encryption key, and send the telemetry message to a first client system configured to: decrypt the first encryption key from the encrypted first encryption key based on the second encryption key; and the storage device telemetry data from the encrypted storage device telemetry data.

Implementations may include one or more of the following features. The encryption engine may be further configured to encrypt, using a third encryption key, the first encryption key. The telemetry message may further include the encrypted first encryption key based on the third encryption key. The message handler may be further configured to send the telemetry message to a second client system configured to decrypt: the first encryption key from the encrypted first encryption key based on the third encryption key; and the storage device telemetry data from the encrypted storage device telemetry data. The first encryption key may be a symmetric key, the second encryption key may be a public key of a public-private key pair, and the first client system may include a private encryption key for the public-private key pair of the second encryption key. The system may further include a data storage device configured to periodically collect telemetry data sets and send each telemetry data set of a plurality of data sets to the encryption engine, where the encryption engine may be further configured to encrypt each telemetry data set and the message handler may be further configured to send each encrypted telemetry data set to the first client system. The data storage device may include the encryption engine and the message handler; the data storage device may be further configured to generate a new first encryption key for each telemetry data set; and the encryption engine may be further configured to encrypt each telemetry data set using a different first encryption key. The data storage device may by further configured to use a non-volatile memory express (NVMe) storage protocol; and the message handler may be further configured to use an NVMe telemetry command to send the telemetry message. The telemetry message may further include: a plurality of data sections including the storage device telemetry data; and a table of contents configured to indicate each data section of the plurality of data sections. The encryption engine may be further configured to encrypt the table of contents. The encryption engine may be further configured to: encrypt, using the first encryption key, a first data section of the plurality of data sections; and encrypt, using the second encryption key, a second data section of the plurality of data sections. The table of contents may be further configured to indicate encryption keys used to encrypt each data section of the plurality of data sections. The system may further include the first client system, including: a telemetry data manager configured to receive the telemetry message, determine the encrypted storage device telemetry data, and determine the encrypted first encryption key based on the second encryption key; and a decryption engine configured to decrypt the first encryption key from the encrypted first encryption key based on the second encryption key and the storage device telemetry data from the encrypted storage device telemetry data. The telemetry data manager may be further configured to: store a private encryption key from a public-private key pair for the second encryption key; and display the storage device telemetry data on a user interface. The storage device telemetry data may include at least one data type selected from: self-monitoring and reporting technology (smart) data; non-volatile memory express (NVMe) data logs; dynamic storage device configuration data; event data logs; debug data; firmware management data; error data; and workload data. The decryption engine may be further configured to use the private encryption key to decrypt the first encryption key from the encrypted first encryption key.

Another general aspect includes a computer-implemented method, including: collecting storage device telemetry data; encrypting, using a first encryption key, the storage device telemetry data; encrypting, using a second encryption key, the first encryption key; formatting a telemetry message, where the telemetry message includes the encrypted storage device telemetry data and the encrypted first encryption key based on the second encryption key; sending the telemetry message to a first client system; receiving, by the first client system, the telemetry message; decrypting, by the first client system, the first encryption key from the encrypted first encryption key based on the second encryption key; and decrypting, by the first client system, the storage device telemetry data from the encrypted storage device telemetry data.

Implementations may include one or more of the following features. The computer-implemented method may include: encrypting, using a third encryption key, the first encryption key, where the telemetry message further includes the encrypted first encryption key based on the third encryption key; sending the telemetry message to a second client system; decrypting, by the second client system, the first encryption key from the encrypted first encryption key based on the third encryption key; and decrypting, by the second client system, the storage device telemetry data from the encrypted storage device telemetry data. The computer-implemented method may include determining, by the first client system, a private encryption key for a public-private key pair of the second encryption key, where: decrypting the first encryption key from the encrypted first encryption key uses the private encryption key; the first encryption key is a symmetric key; and the second encryption key is a public key of the public-private key pair. The computer-implemented method may include: periodically collecting telemetry data sets; encrypting each telemetry data set; sending each encrypted telemetry data set to the first client system; and decrypting, by the first client system, each encrypted telemetry data set. The computer-implemented method may include: generating a new first encryption key for each telemetry data set; and encrypting each telemetry data set using a different first encryption key. Collecting the storage device telemetry data may include collecting the storage device telemetry data from a storage device configured to use a non-volatile memory express (NVMe) storage protocol and sending the telemetry message may include using an NVMe telemetry command. The computer-implemented method may include encrypting the table of contents in the telemetry message, where the telemetry message includes a plurality of data sections including the storage device telemetry data and the table of contents indicates each data section of the plurality of data sections. The computer-implemented method may include: encrypting, using the first encryption key, a first data section of the plurality of data sections; and encrypting, using the second encryption key, a second data section of the plurality of data sections, where the table of contents further indicates encryption keys used to encrypt each data section of the plurality of data sections. The computer-implemented method may include: storing, in the first client system, a private encryption key from a public-private key pair for the second encryption key, where decrypting the encrypted first encryption key includes using the private encryption key; and storing, in a data storage device, a public encryption key from the public-private key pair for the second encryption key, where encrypting the first encryption key includes using the public encryption key.

Still another general aspect includes a storage system including: a data storage device that includes a storage device controller, including a controller processor and a controller memory, and a storage medium; a client system that includes a client processor and a client memory; means for collecting, from the data storage device, storage device telemetry data; means for encrypting, using a first encryption key, the storage device telemetry data; means for encrypting, using a second encryption key, the first encryption key; means for formatting a telemetry message, where the telemetry message includes the encrypted storage device telemetry data and the encrypted first encryption key based on the second encryption key; means for sending the telemetry message to the client system; means for receiving, by the client system, the telemetry message; means for decrypting, by the client system, the first encryption key from the encrypted first encryption key based on the second encryption key; means for decrypting, by the client system, the storage device telemetry data from the encrypted storage device telemetry data; and means for displaying, by the client system, the storage device telemetry data on a user interface.

The various embodiments advantageously apply the teachings of data storage devices and/or storage systems to improve the functionality of such computer systems. The various embodiments include operations to overcome or at least reduce the issues previously encountered in storage systems and, accordingly, are more secure and/or reliable than other computing systems. That is, the various embodiments disclosed herein include hardware and/or software with functionality to improve the security of telemetry data, such as by using multi-layer encryption for formatting telemetry messages for access by multiple parties. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
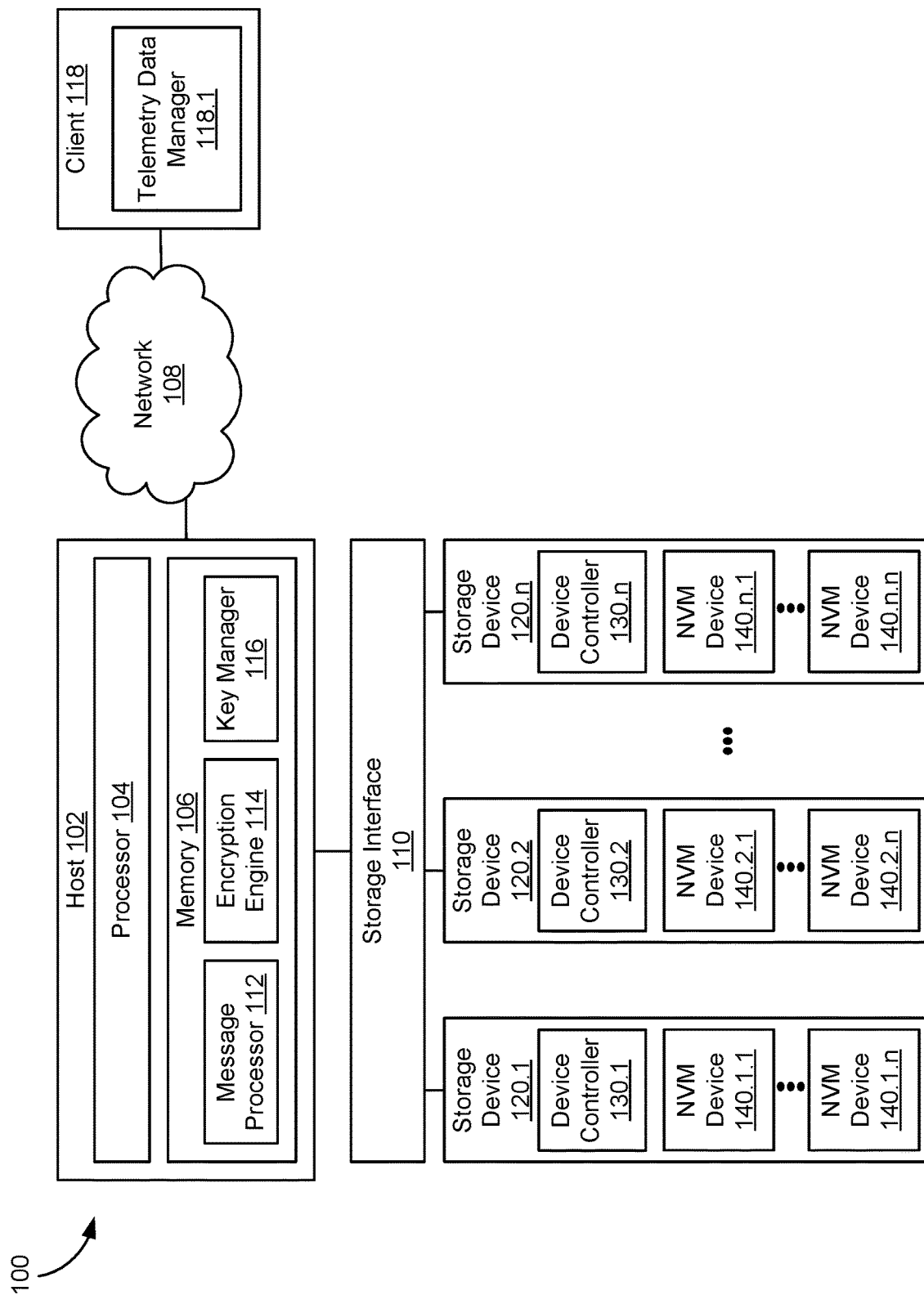
FIG. 1 schematically illustrates a storage system with encrypted telemetry data.

FIG. 1 shows an embodiment of an example data storage system 100 with multiple data storage devices 120 interconnected by a storage interface 110. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server or storage array blade or similar storage unit for use in data center storage racks or chassis. Storage devices 120 may interface with one or more hosts 102 and provide data storage and retrieval capabilities for or through those host systems. In some embodiments, host 102 may support one or more clients 118 configured to access data in or about storage devices 120. For example, client 118 may include one or more applications that access data from storage devices 120 through network 108 and host 102 and/or through a network fabric and storage interface 110. In some embodiments, storage devices 120 may be configured in a storage hierarchy that includes storage nodes, storage controllers, and/or other intermediate components between storage devices 120 and host 102. For example, each storage controller may be responsible for a corresponding set of storage nodes and their respective storage devices connected through a corresponding backplane network and/or network fabric, though only storage devices 120 and host 102 are shown.

In the embodiment shown, a number of storage devices 120 are attached to a common storage interface 110 for host communication. For example, storage devices 120 may include a number of drives arranged in a storage array, such as storage devices sharing a common rack, unit, or blade in a data center or the solid state drives (SSDs) in an all flash array. In some embodiments, storage devices 120 may share a backplane network, network switch(es), and/or other hardware and software components accessed through storage interface 110. For example, storage devices 120 may connect to storage interface 110 through a plurality of physical port connections that define physical, transport, and other logical channels for establishing communication with the different components and subcomponents for establishing a communication channel to host 102. In some embodiments, storage interface 110 may provide a primary host interface for storage device management and host data transfer, as well as a control interface that includes limited connectivity to the host for low-level control functions, such as through a baseboard management controller (BMC).

In some embodiments, data storage devices 120 are, or include, solid-state drives (SSDs). Each data storage device 120.1-120.$n$ may include a non-volatile memory (NVM) or storage device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a storage device controller 130, which includes one or more storage controller processors (also sometimes called central processing units (CPUs), processor units, microprocessors, or microcontrollers) configured to execute instructions in one or more programs stored in storage controller memory. In some embodiments, the one or more processors are shared by one or more components within, and in some cases, beyond the function of the device controllers. Media devices 140 may be coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks. In some configurations, logical and/or physical zones may be assigned within the storage devices 120 as groups of data blocks allocated for specified host data management purposes.

In some embodiments, host or host system 102 may be coupled to data storage system 100 through a network interface that is part of host fabric network that includes storage interface 110 as a host fabric interface. In some embodiments, multiple host systems 102 (only one of which is shown in FIG. 1) and/or clients 118 are coupled to data storage system 100 through the fabric network, which may include a storage network interface or other interface capable of supporting communications with multiple host systems 102. In some embodiments, the fabric network may operate over network 108 and network 108 may include a wired and/or wireless network (e.g., public and/or private computer networks in any number and/or configuration) which may be coupled in a suitable way for transferring data. For example, network 108 may include any means of a conventional data communication network such as a local area network (LAN), a wide area network (WAN), a telephone network, such as the public switched telephone network (PSTN), an intranet, the internet, or any other suitable communication network or combination of communication networks.

Host system 102 and/or client system 118, or a respective host or client in a system having multiple hosts or clients, may be any suitable computer device, such as a computer, a computer server, a laptop computer, a tablet device, a netbook, an internet kiosk, a personal digital assistant, a mobile phone, a smart phone, a gaming device, or any other computing device. Host system 102 is sometimes called a host, client, or client system, depending on respective roles, configurations, and contexts. In some embodiments, host system 102 is a server system, such as a server system in a data center, or a storage system, such as a storage array in a data center. In some embodiments, client system 118 is a user device configured with one or more applications and/or configured to access one or more applications on host system 102. For example, host 102 may be configured to gather and store telemetry data from storage devices 120 and client 118 may include a telemetry data manager 118.1 configured to access, analyze, and display the aggregate telemetry data collected by host 102. In some embodiments, the one or more host systems 102 are one or more host devices distinct from a storage controller or storage node housing the plurality of storage devices 120. The one or more host systems 102 may be configured to store and access data in the plurality of storage devices 120.

Host system 102 may include one or more central processing units (CPUs) or processors 104 for executing compute operations or instructions for accessing storage devices 120 through storage interface 110. In some embodiments, processor 104 may be associated with operating memory 106 for executing both storage operations and a storage interface protocol compatible with storage interface 110 and storage devices 120. In some embodiments, a separate storage interface unit (not shown) may provide the storage interface protocol and related processor and memory resources. From the perspective of storage devices 120, storage interface 110 may be referred to as a host interface and provides a host data path between storage devices 120 and host 102.

Host system 102 may include memory 106 configured to support various data access and management functions, generally in support of one or more applications. Memory 106 may include a random access memory (RAM) or another type of dynamic storage device that stores information and instructions for execution by processor 104 and/or a read only memory (ROM) or another type of static storage device that stores static information and instructions for use by processor 104 and/or any suitable storage element such as a hard disk or a solid state storage element. For example, memory 106 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols, over storage interface 110 to interact with host 102.

Host system 102 may be configured to receive secure telemetry data from storage devices 120. For example, host system 102 may receive encrypted telemetry messages based on telemetry commands from storage devices 120 on a periodic or on-demand basis and decrypt the telemetry data for use by host system 102 and/or client 118. Host system 102 may include a plurality of modules or subsystems that are stored and/or instantiated in memory 106 for execution by processor 104 as instructions or operations. For example, memory 106 may include message processor 112 configured to receive telemetry messages from storage device 120 using a storage protocol, such as NVMe. For example, memory 106 may include an encryption engine 114 including one or more ciphers for decrypting encrypted data in the telemetry message. For example, memory 106 may include a key manager supporting encryption keys for multi-level encryption, such as a symmetric offload encryption and an asymmetric access control encryption.

In some embodiments, message processor 112, encryption engine 114, and key manager 116 may include an interface protocol and/or set of functions, parameters, and/or data structures for receiving, parsing, decrypting, and storing telemetry data from a telemetry message. For example, message processor 112 may receive a telemetry message in a telemetry command from one of storage device 120. Message processor 112 may parse the telemetry message to identify headers, table of contents, encryption keys, and/or one or more data sections containing encrypted telemetry data. Message processor 112 may invoke encryption engine 114 for one or more decryption tasks. For example, encryption engine 114 may include decryption processing logic based on one or more ciphers, such as symmetric or asymmetric ciphers based on one or more encryption keys. In some embodiments, message processor 112 may access key manager 116 for one or more stored encryption keys for use in decrypting the telemetry message. For example, one or more portions of the telemetry message may be encrypted using a public encryption key that is part of a public-private key pair and the corresponding private encryption key may be retrieved by key manager 116 for use by encryption engine 114. In some embodiments, message processor 112, encryption engine 114, and key manager 116 may support multi-level encryption where they use an access control encryption key to decrypt an encrypted offload encryption key included in the telemetry message and then use the decrypted offload encryption key to decrypt the telemetry data.

In some embodiments, client 118 may include one or more applications for accessing or using telemetry data collected by host 102. For example, client 118 may include a telemetry data manager 118.1 configured to access, analyze, display, and/or automatically respond to aggregate telemetry data. Telemetry data manager 118.1 may include an interface protocol and/or set of functions, parameters, and/or data structures for interfacing with aggregate telemetry data received and stored by message processor 112 from one or more storage devices 120 over a monitoring period. For example, telemetry data manager 118.1 may provide a user interface, analytical tools, and/or system management functions or interfaces to enable a user to use telemetry data to monitor the performance and status of storage devices 120 and/or their aggregate performance in one or more hierarchical components, such as storage controllers, storage arrays, RAID groups, etc. In some embodiments, telemetry data manager 118.1 may be configured to automatically respond to one or more triggers or events in telemetry data to initiate maintenance or a change in operating configuration parameters in storage devices 120 and/or other components in storage system 100.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
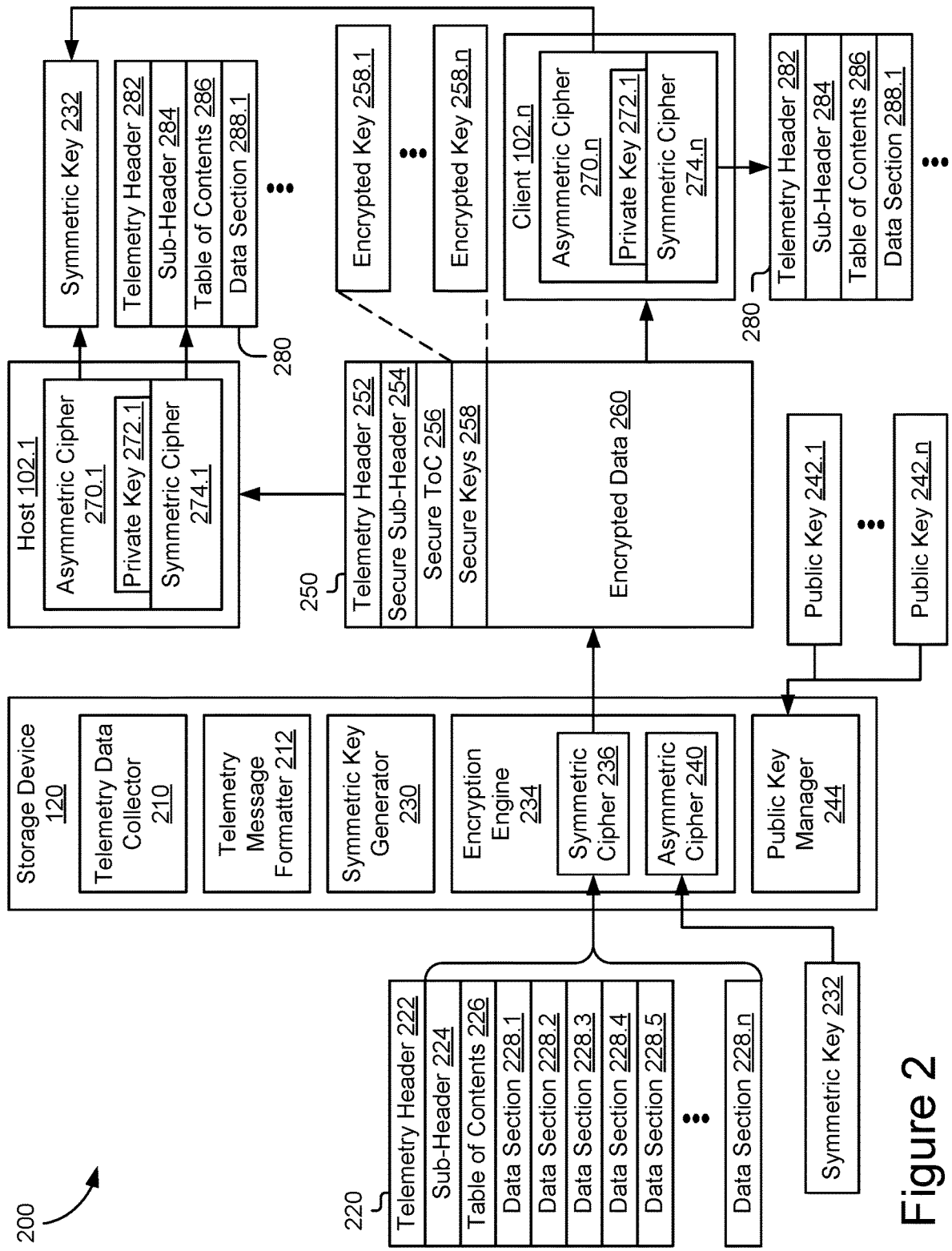
FIG. 2 schematically illustrates an architecture for multi-layer encryption of telemetry data that may be used by the storage system of FIG. 1.

FIG. 2 shows a schematic representation of a multi-level encryption architecture for telemetry data messages that may be used by a storage system 200 configured similarly to storage system 100 of FIG. 1. A plurality of hosts 102.1-102.n may communicate with storage device 120 to receive and decrypt telemetry data using multi-level encryption that includes both symmetric and asymmetric encryption. In some embodiments, the functions of hosts 102 may be executed by message processor 112 with the assistance of encryption engine 114 and key manager 116, and the functions of storage device 120 may be executed by storage device controller 130. For example, telemetry data collector 210, telemetry message formatter 212, symmetric key generator 230, encryption engine 234, and public key manager 244 may be embodied in storage device controller hardware, such as processors, memories, and/or hardware encryption engines.

Telemetry data collector 210 may be configured to collect telemetry data for storage device 120. For example, telemetry data collector 210 may include scheduled, event, and/or command-based triggers for collecting various operational parameters of storage device. In some embodiments, telemetry data may include one or more parameters related to storage device read/write operations, storage media space and performance, sensors, and/or storage device management. For example, telemetry data may include workload data, error data, debug data, event data logs, dynamic storage configuration data (i.e., storage device configuration parameters that change), firmware management data, vendor-defined data logs, NVMe data logs, and/or SMART data logs. In some embodiments, telemetry data collector 210 may receive telemetry data from one or more storage device subsystems and/or memory registers or data repositories for collecting the target operational parameters. In some embodiments, telemetry data collector 210 may include one or more logs and corresponding logic for adding data to those logs during storage device operation. Telemetry data collector 210 may forward a set of telemetry data, such as telemetry data for a defined collection period, request, or event, to telemetry message formatter 212.

Telemetry message formatter 212 may include logic for mapping telemetry data received from telemetry data collector 210 to a defined telemetry message format, such as the syntax requirements of an NVMe telemetry command or similar storage protocol telemetry command. For example, telemetry message formatter 212 may format the received telemetry data in telemetry message 220. In some embodiments, telemetry message 220 may include a telemetry header 222, a telemetry sub-header 224, a table of contents 226, and one or more data sections 228 for the telemetry data itself. For example, telemetry header 222 may include command identifiers, parameters, and/or other protocol requirements for designating a telemetry command or message for the communication protocols used for command communication between storage device 120 and hosts 102. Sub-header 224 may include vendor or implementation specific identifiers, parameters, and/or other protocol requirements for designated a specific implementation of the telemetry command or message for storage device 120 and/or storage system 200. Table of contents 226 may identify the locations and/or layout of data sections 228 in telemetry message 220 and/or include other identifiers or parameters related to those data sections. Data sections 228.1-228.n may include various portions of the telemetry data. For example, each data section may correspond to a subset of related parameters, time periods, data sources or types, and/or other organizational schemes for the telemetry data.

Telemetry message formatter 212 may be configured to encrypt one or more portions of telemetry message 220. For example, telemetry message formatter 212 may be configured to encrypt data sections 228, table of contents 226, and/or sub-header 224. In some embodiments, the fields within telemetry message 220 may be encrypted using a symmetric encryption key 232. For example, symmetric key generator 230 may be configured to generate the symmetric encryption key 232 for use by encryption engine 234 when encrypting the telemetry data. In some embodiments, symmetric key generator 230 may be configured to generate a random encryption key for each telemetry message. For example, a new offload encryption key may be generated for each telemetry message such that each telemetry message uses a different symmetric encryption key 232. In the event that the key is compromised for one message, it may not enable decryption of other telemetry messages. Encryption engine 234 may include a symmetric cipher 236 to use the symmetric encryption key 232 to encrypt the selected portions of telemetry message 220. Symmetric cipher 236 may be an encryption algorithm that uses the same key to both encrypt and decrypt the target data. In some embodiments, telemetry message formatter 212 may include symmetric encryption key 232 in the telemetry message for use by a receiving node, such as hosts 102, for decrypting the encrypted telemetry data.

Telemetry message formatter 212 may be configured for multi-level encryption, where symmetric encryption key 232 is encrypted using another encryption algorithm and corresponding key. For example, encryption engine 234 may further include an asymmetric cipher 240 invoked by telemetry message formatter 212 to encrypt symmetric encryption key 232 before adding it to the encrypted telemetry message. Asymmetric cipher 240 may be an encryption algorithm that uses different keys for encryption and decryption, such as a public-private encryption key pair. In some embodiments, telemetry message formatter 212 may support multiple access control keys to selectively allow hosts 102 to have different encryption keys for accessing encrypted telemetry data. For example, storage device 120 may include a plurality of public encryption keys 242.1-242.$n$ corresponding to a plurality of parties, nodes, and/or hosts 102. In some embodiments, public key manager 244 may store the plurality of public encryption keys 242 for use by asymmetric cipher 240 and each host 102 may include a private encryption key 272 corresponding to a public encryption key 242. Telemetry message formatter 212 may include a plurality of encrypted versions of symmetric encryption key 232 in the encrypted telemetry message for use by hosts 102 with the corresponding private encryption keys 272.

Telemetry message formatter 212 may generate an encrypted telemetry message 250 by processing the selected portions of telemetry message 220 through encryption engine 234. For example, encrypted telemetry message 250 may include: telemetry header 252 corresponding to telemetry header 222; secure sub-header 254 corresponding to an encrypted version of sub-header 224; secure table of contents 256 corresponding to an encrypted version of table of contents 226; secure keys 258 corresponding to one or more encrypted versions of symmetric encryption key 232; and encrypted data 260 corresponding to encrypted versions of data sections 228. In some embodiments, secure keys 258 may include a plurality of encrypted keys 258.1-258.$n$ of symmetric encryption key 323 corresponding to public encryption keys 242. Storage device 120 may send encrypted telemetry message 250 to hosts 102. For example, encrypted telemetry message 250 may be sent over a network fabric between storage device 120 and hosts 102 in accordance with NVMe telemetry command protocols.

Hosts 102 may include asymmetric ciphers 270 and private encryption keys 272 configured to decrypt secure keys 258 and return symmetric encryption key 232. Hosts 102 may include symmetric ciphers 274 configured to decrypt encrypted data 260, secure sub-header 254, and/or secure table of contents 256 to return the original telemetry message content 280. For example, telemetry header 282 may correspond to original telemetry header 222, sub-header 284 from secure sub-header 254 may correspond to original sub-header 224, table of contents 286 from secure table of contents 256 may correspond to original table of contents 226, and data section 288.1, etc. from encrypted data 260 may correspond to original data sections 228.1, etc. In some embodiments, encrypted telemetry message 250 may be received and processed by a message processor in each host 102, such as message processor 112 in FIG. 1. Asymmetric ciphers 270 and symmetric ciphers 274 may be included in an encryption engine in each host 102, such as encryption engine 114 in FIG. 1. Private encryption keys 272 may be stored in a key manager in each host 102, such as key manager 116 in FIG. 1. In some embodiments, hosts 102 may be configured to store, analyze, and/or display telemetry data from the original telemetry message content 280 through a telemetry data manager application, such as telemetry data manager 118.1 in FIG. 1.

Figure 3:
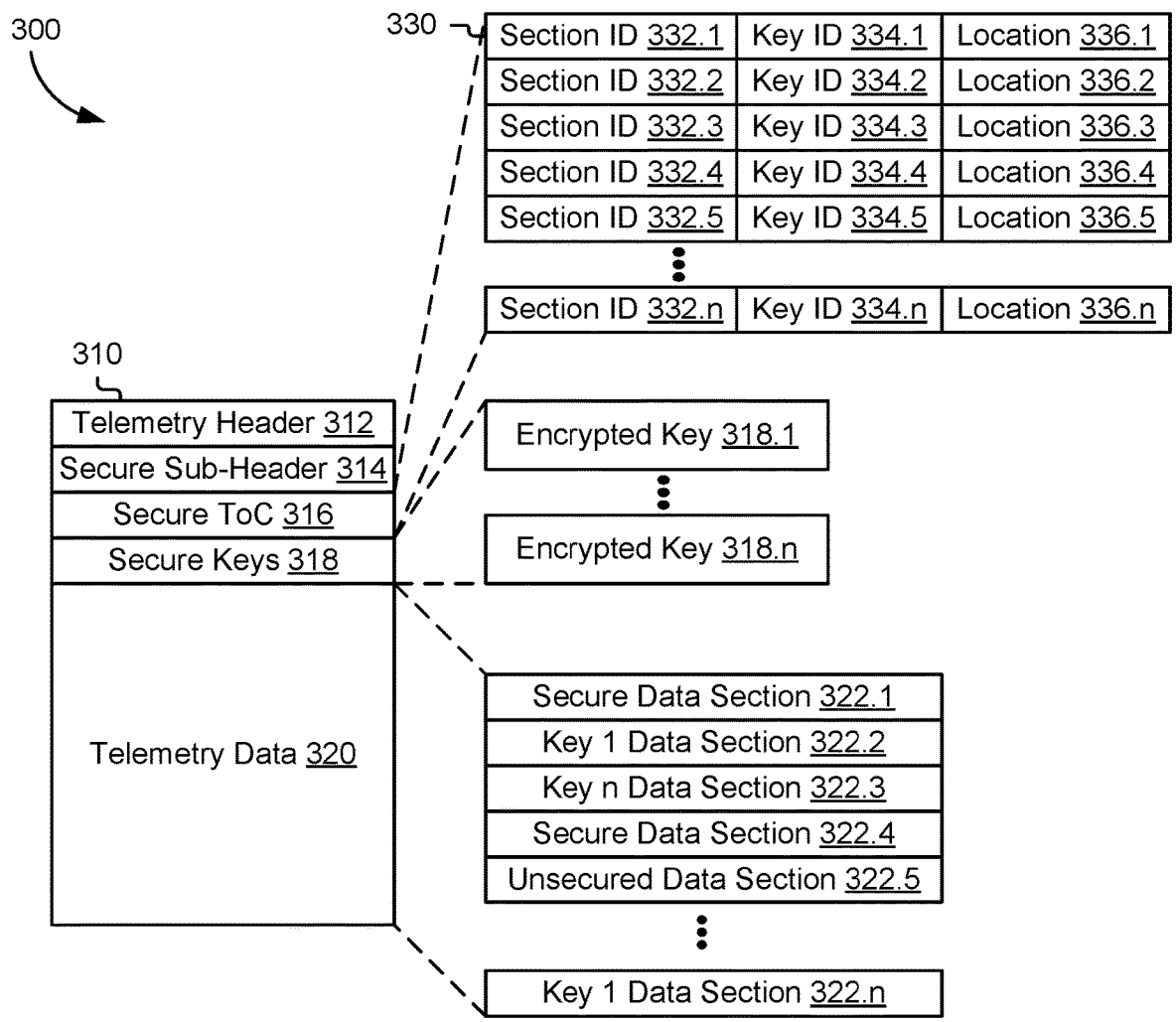
FIG. 3 schematically illustrates a secure telemetry data message format that may be used by the storage system of FIG. 1.

FIG. 3 shows a schematic representation of a secure telemetry data message format 300 that may be used by storage system 100 of FIG. 1. For example, storage devices 120 may send telemetry data messages to host 102 using secure telemetry data message format 300. In some embodiments, storage devices 120 may be configured to selectively encrypt different data sections of telemetry data with different encryption algorithms and keys, such as symmetric encryption using an offload encryption key and asymmetric encryption using a plurality of access control encryption keys. In the example shown, encrypted telemetry message 310 may include a telemetry header 312 and secure sub-header 314 similar to telemetry header 252 and secure sub-header 254 described with regard to FIG. 2. Secure keys 318 may similarly include encrypted versions of the offload encryption key as encrypted keys 318.1-318.$n$. In some embodiments, secure table of contents 316 may include additional fields or parameters for identifying the encryption used for each data section and each data section 322.1-322.$n$ may include different levels of encryption or no encryption at all.

In some embodiments, secure table of contents 316 may include a plurality of table entries 330, where each table entry 330 correlates to a data section 322. Each table entry 330 may include a plurality of fields or parameters, such as section identifier 332, key identifier 334, and data location 336. For example, section identifier 332.1 may correspond to an identifier for data section 322.1, key identifier 334.1 may include an identifier for the encryption used for data section 322.1, and data location 226.1 may provide the start and end memory locations in encrypted telemetry message 310 for data section 322.1. Each table entry 330 may similarly correspond to data sections 332.1-322.$n$.

In the example shown, secure data section 322.1 may be a data section including telemetry data authorized for access by all authorized entities. For example, secure data section 322.1 may be encrypted with only the offload encryption algorithm and corresponding offload encryption key for encrypted telemetry message 310. Any authorized entity having a valid private encryption key for an encrypted key 318.1-318.$n$ may decrypt the offload encryption key and secure data section 322.1. Key identifier 334.1 in secure table of contents 316 may include a parameter identifying that the offload encryption key was used to encrypt secure data section 322.1.

Key 1 data section 322.2 may be a data section including telemetry data authorized for access only by the entity controlling the private key for a first access control encryption key. For example, key 1 data section 322.2 may be encrypted using the access control encryption algorithm and the first access control encryption key. Key n data section 322.3 may be a data section including telemetry data authorized for access only by the entity controlling the private key for a different access control encryption key n. For example, key n data section 322.3 may be encrypted using the access control encryption algorithm and access control encryption key n. In some embodiments, encrypted telemetry message 310 may support any number of access control entities with corresponding access control encryption keys, such as public-private key pairs where the public key is stored in the storage device and the private key is used by one or more host or client systems. Respective key identifiers 334.2 and 334.3 in secure table of contents 316 may identify the respective encryption keys used, access control encryption key 1 for 334.2 and access control encryption key n for 334.3.

Secure data section 322.4 may be another data section authorized for access by all authorized users, with the same access controls as secure data section 322.1. In some embodiments, secure telemetry message 310 may support unencrypted telemetry data alongside the encrypted telemetry data. For example, unsecured data section 322.5 may include unencrypted telemetry data that may be accessed by any recipient of secure telemetry message 310, without requiring any access control encryption key. Any number and combination of data sections using the various encryption algorithms and access controls may be used. For example, there may be multiple data sections secured for access control encryption key 1, such as key 1 data section 322.2 and key 1 data section 322.*n*. Secure table of contents 316 may provide an index to data sections 322.1-322.*n* that enables recipients of the message to determine which data sections they have access to. In some embodiments, secure table of contents 316 may include a plurality of table of contents with table entries limited to those accessible using a single set of access control credentials. For example, a first version of secure table of contents 316 may include only entries accessible by all authorized users, such as secure data section 322.1, secure data section 322.4, and unsecure data section 322.5, and be encrypted with the offload encryption key. A second version of secure table of contents 316 may include entries accessible by the authorized entity controlling access control encryption key 1, such as secure data section 322.1, key 1 data section 322.2, secure data section 322.4, unsecured data section 322.5, and key 1 data section 322.*n*, and be encrypted with access control encryption key 1. Additional version of the table of contents may be included for each access control encryption key and/or the unsecured data sections (in an unencrypted table of contents).

Figure 4:
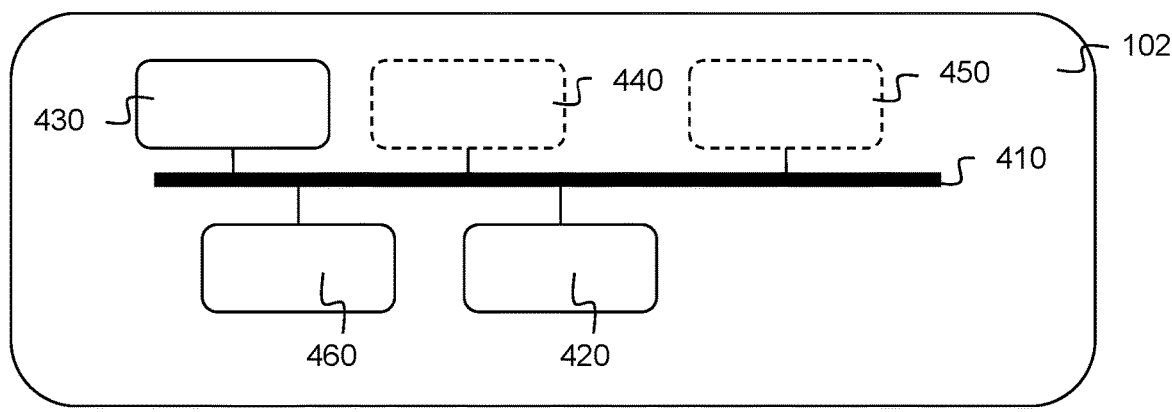
FIG. 4 schematically illustrates a host or client node of the storage system of FIG. 1.

FIG. 4 shows a schematic representation of an example host system 102 and/or client system 118. Host system 102 may comprise a bus 410, a processor 420, a local memory 430, one or more optional input units 440, one or more optional output units 450, and a communication interface 460. Bus 410 may include one or more conductors that permit communication among the components of host 102. Processor 420, sometimes referred to as a host process or client processor, may include any type of conventional processor or microprocessor that interprets and executes instructions. Local memory 430, sometimes referred to as a host memory or client memory, may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, message processor 112, encryption engine 114, and key manager 116 in FIG. 1 may be instantiated in instructions, operations, or firmware stored in local memory 430 for execution by processor 420. An optional input unit 440 may include one or more conventional mechanisms that permit an operator to input information to host 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a peripheral component interconnect express (PCIe) interface for connecting to storage devices 120 and/or a network interface for communicating with storage devices 120 over a fabric network.

In some embodiments, client 118 in FIG. 1 may be configured similarly to host 102 and include the components shown in and described for FIG. 4. For example, client 118 may include bus 410, processor 420, local memory 430, one or more optional input units 440, one or more optional output units 450, and communication interface 460. Telemetry data manager 118.1 may be stored in memory 430 for execution by processor 420 and communication interface 460 may enable network communication with host 102 and/or storage devices 120, such as over a fabric network.

Figure 5:
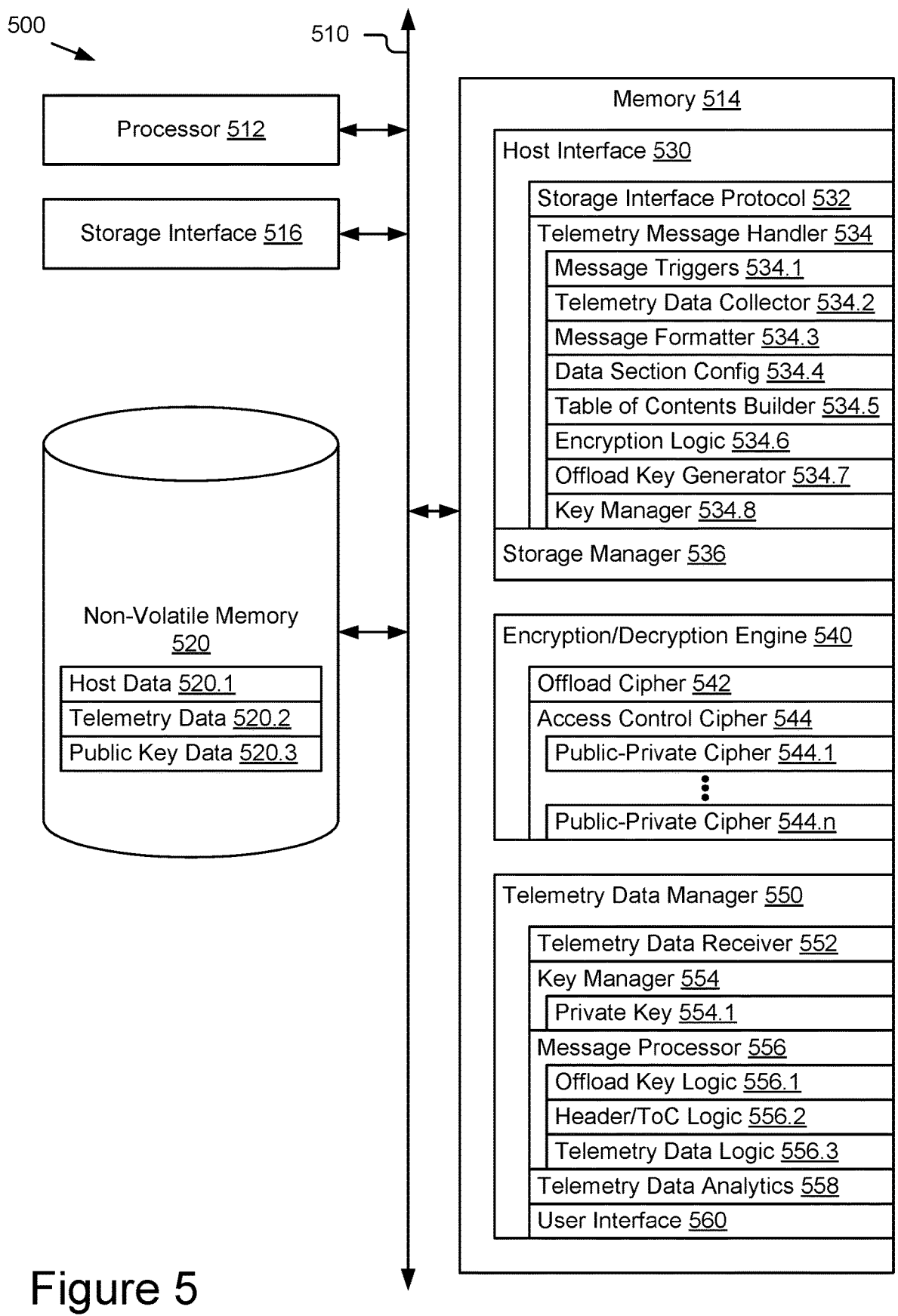
FIG. 5 schematically illustrates some elements of the storage system of FIG. 1-4 in more detail.

FIG. 5 schematically shows selected modules of a storage system 500 configured for secure telemetry messages from storage devices to other nodes, such as host or client systems. Storage system 500 may incorporate elements and configurations similar to those shown in FIGS. 1-4. For example, storage system 500 may include one or more storage devices configured as storage device 120 in storage system 100, where the storage device includes bus 510, processor 512, memory 514 (instantiating host interface 530, storage manager 536, and encryption/decryption engine 540), and storage interface 516 in storage device controller 130 and non-volatile memory 520 in NVM devices 140. Storage system 500 may include one or more host or client systems configured as host 102 and/or client 118 in storage system 100, where the host or client system includes bus 510, processor 512, and memory 514 (instantiating encryption/decryption engine 540 and telemetry data manager 550) in memory 106 or 430.

Storage device 500 may include a bus 510 interconnecting at least one processor 512, at least one memory 514, and at least one interface, such as storage interface 516. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage interface 516 may include a physical interface for communication between a storage device and a host or client using an interface protocol that supports storage device access. For example, storage interface 516 may include a PCIe, serial advanced technology attachment (SATA), serial attached small computer system interface (SCSI) (SAS), or similar storage interface connector supporting NVMe access to solid state media comprising non-volatile memory devices 520. In some embodiments, storage interface 516 may connect to or incorporate a network interface for connecting to a fabric network and/or other network. For example, storage interface 516 may connect to a network fabric interface through a backplane network and/or storage network interface controller supporting an NVMe-over-fabric (NVMeoF) protocol. In some embodiments, storage devices, hosts, clients, and/or other components of storage system 500 may be configured as nodes in the NVMeoF topology and communicate using supported NVMe commands, such as NVMe telemetry commands.

Storage device 500 may include one or more non-volatile memory devices 520 configured to store host data 520.1. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells. In some embodiments, non-volatile memory devices 520 may include the storage medium of a storage device, such as NVM devices 140 in storage devices 120.

Storage system 500 may include a plurality of modules or subsystems that are stored and/or instantiated in memory 514 for execution by processor 512 as instructions or operations. For example, memory 514 may include a host interface 530 configured to receive, process, and respond to host data requests and/or management commands from client or host systems. Memory 514 may include storage manager 536 configured to manage storage and management operations to the media devices comprising non-volatile memory 520. Memory 514 may include an encryption/decryption engine 540 configured to encrypt and/or decrypt target data using a selected encryption algorithm and corresponding encryption key. Memory 514 may include a telemetry data manager 550 configured to receive, process, store, and analyze and/or display telemetry data from one or more storage devices.

Host interface 530 may include an interface protocol and/or set of functions, parameters, and/or data structures for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. Host interface 530 may also support administrative commands and/or management operations initiated by the host or the storage device, such as configuration changes, garbage collection, log access, firmware management, reporting of operational parameters (e.g., telemetry data), etc. For example, host interface 530 may support administrative command sets for configuring namespaces, queue control, log access, feature identification and configuration, security settings, and/or telemetry data reporting. In some embodiments, host interface 530 may enable direct memory access and/or access over NVMe protocols through storage interface 516. For example, host interface 530 may include host communication protocols compatible with PCIe, SATA, SAS, and/or another bus interface that supports use of NVMe and/or RDMA protocols for data access. Host interface 530 may further include host communication protocols compatible with configuring and enabling secure telemetry messages from a storage device to one or more hosts or clients. For example, host interface 530 may collect, format, encrypt, and send telemetry data from the storage device on a periodic, event-based, or host-response basis.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage interface 516. For example, storage interface protocol 532 may include both PCIe and NVMe compliant communication, command, and syntax functions, procedures, and data structures. In some embodiments, host interface 530 may include a telemetry message handler 534 configured to handle one or more command types for sending telemetry data from the storage device to one or more hosts. In some embodiments, host interface 530 may include additional modules (not shown) for input/output (I/O) commands, buffer management, storage device configuration and management, and other host-side functions.

In some embodiments, telemetry message handler 534 may be configured to handle encrypted telemetry messages for secure communication of telemetry data to a plurality of hosts. For example, telemetry message handler 534 may include message triggers 543.1, telemetry data collector 534.2, message formatter 534.3, data section configuration 534.4, table of contents builder 534.5, encryption logic 534.6, offload key generator 534.7, and key manager 534.8.

Message triggers 534.1 may include logic configured to determine when and what operational data should be included in a telemetry data set for one or more telemetry messages. For example, message triggers 534.1 may include a plurality of rules-based conditions for initiating a telemetry message related to one or more operational parameters. In some embodiments, message triggers 534.1 may be selected from periodic time-based triggers (e.g., a regular interval for reporting storage parameters, I/O workloads, error rates, etc.), event-based triggers (e.g., before or after a power cycle event, following an error condition and related dump, following a firmware update, etc.), and/or request-based triggers (e.g., a telemetry data request from one or more hosts).

Telemetry data collector 534.2 may include logic and/or data structures for locating the telemetry data set for a particular telemetry message. For example, responsive to a telemetry message trigger from message triggers 534.1, telemetry data collector 534.2 may determine a set of operational parameters corresponding to the telemetry data to be reported in the telemetry message. In some embodiments, message triggers 534.1 may map to a set of operational parameters, logs, registers, and/or selection criteria (such as a time period, parameter type, etc.) that telemetry data collector 534.2 may use to determine a telemetry data set. For example, telemetry data collector 534.2 may read the parameter or log values or contents from their respective storage locations in telemetry data 520.2 and/or registers or data structures maintained by storage manager 536, organize the parameters and values into the telemetry data set, and forward the telemetry data set to message formatter 534.3.

Message formatter 534.3 may include logic for formatting the telemetry data set according to the syntax requirements of one or more telemetry commands, such as the telemetry commands supported by storage interface protocol 532. For example, message formatter 534.3 may apply one or more headers, tables of contents, and data sections to the telemetry data set. In some embodiments, message formatter 534.3 may include a template for populating a telemetry header and sub-header, such as a telemetry command header and a vendor-specific sub-header. Message formatter 534.3 may include or access a data section configuration 534.4 configured to define a plurality of data sections into which portions of the telemetry data set may be allocated. For example, data section configuration 534.4 may group similar operational parameters based on data types, time periods, and/or access privileges into a plurality of data sections of varying lengths. In some embodiments, data section configuration 534.4 may include a data section configuration table that includes parameters for defining the contents of each section and corresponding section identifier and/or access parameters, such as encryption type, authorized entities, authorized key identifiers, etc. Message formatter 534.3 may include or access a table of contents builder 534.5 configured to generate at least one table of contents for the data section configuration being used by the particular telemetry message. For example, table of contents builder 534.5 may generate a table comprising a plurality of table entries corresponding to the different data sections and including a section identifier and location data describing the position of the data section in the telemetry message (e.g., starting location and ending location or starting location and length).

Telemetry message handler 534 may support encryption of one or more portions of the telemetry message. For example, message formatter 534.3 may be configured to invoke encryption logic 534.6 for encrypting the telemetry data set, portions thereof, table of contents, and/or headers. In some embodiments, encryption logic 534.6 may support multi-level encryption to support both an offload encryption algorithm and one or more access control encryption algorithms as described above with regard to FIGS. 2 and 3. For example, encryption logic 534.6 may invoke encryption/decryption engine 540 to selectively encrypt the telemetry data set using offload cipher 542 and selectively encrypt the offload encryption key used for offload cipher 542 using access control cipher 544. Message formatter 534.3 may be further configured to add the encrypted offload encryption key to the telemetry message, such as in a secure key field.

In some embodiments, telemetry message handler 534 may include offload key generator 534.7 configured to generate the offload encryption key for encrypting the telemetry data set and/or other portions of the telemetry message. For example, offload key generator 534.7 may generate a new offload encryption key for each telemetry data set and/or corresponding telemetry message. In some embodiments, offload key generator 534.7 may be configured to generate a new key on a periodic basis and/or responsive to an event or command, rather than for every telemetry message. In some embodiments, telemetry message handler 534 may include key manager 534.8 configured to manage one or more access control encryption keys for one or more corresponding authorized entities and/or host/client systems. For example, authorized entities may have respective public-private key pairs for use in selectively decrypting portions of the telemetry message and the public keys may be stored by key manager 534.8 in public key data 520.3 for use by encryption/decryption engine 540.

Storage manager 536 may include an interface protocol and/or set of functions, parameters, and data structures for reading, writing, and deleting data units in non-volatile memory devices 520. For example, storage manager 536 may include functions for executing host data operations related to host storage commands received through host interface 530. For example, PUT or write commands may be configured to write host data units to non-volatile memory devices 520 through a write processor. GET or read commands may be configured to read data from non-volatile memory devices 520 through a read processor. DELETE commands may be configured to delete data from non-volatile memory devices 520, or at least mark a data location for deletion until a future garbage collection or similar operation actually deletes the data or reallocates the physical storage location to another purpose. In some embodiments, storage manager 536 may include flash translation layer (FTL) management, data state machine, read/write buffer management, NVM device interface protocols, NVM device configuration/management/maintenance, and other device-side functions. Storage manager 536 may include various functions that generate operational parameters, such as workload data, error rates, configuration parameters, physical parameters, storage parameters (e.g., aggregate storage space used/available/marked for garbage collection, wear leveling statistics, etc.), error logs, event logs, and other operational parameters that may be aggregated and reported in telemetry data.

Encryption/decryption engine 540 may include an interface and set of functions, parameters, and data structures for encrypting target data. For example, encryption/decryption engine 540 may receive target data and return corresponding encrypted target data using a selected cipher and encryption key and/or receive encrypted target data and return corresponding target data using the selected cipher and encryption (or decryption) key. In some embodiments, the encrypting and decrypting functions may be placed in separate encrypting engines and decrypting engines with redundant and/or shared functions where similar functions are used by both encrypting and decrypting operations. In some embodiments, encryption/decryption engine 540 may include a hardware encryption engine embodied in a discrete processor device, such as a system on a chip (SoC), application specific integrated circuit (ASIC), field programmable gate array (FPGA), or other hardware component. Encryption/decryption engine 540 may be embodied in both the message sending node and the message receiving node, such as the storage device sending the telemetry message and the host/client receiving the telemetry message. In some embodiments, encryption/decryption engine 540 may implement one or more selected encryption algorithms and standards for target telemetry message data or portions thereof, such as advanced encryption standard (AES)-128 or another encryption standard.

In some embodiments, encryption/decryption engine 540 may include a plurality of hardware and/or software modules configured to use processor 512 and memory 514 (and/or a dedicated processor and memory of a discrete encryption/decryption engine) to handle or manage defined operations of encryption/decryption engine 540. For example, encryption/decryption engine 540 may include or enable an offload cipher 542 and an access control cipher 544. Offload cipher 542 may include a symmetric encryption algorithm that uses an offload encryption key for encrypting and decrypting telemetry data and/or other portions of a telemetry message generated by telemetry message handler 534 and/or received by telemetry data manager 550. Access control cipher 544 may include an asymmetric encryption algorithm that uses one or more access control encryption keys for encrypting and decrypting telemetry data and/or other portions of the telemetry message generated by message handler 534 and/or received by telemetry data manager 550. In some embodiments, access control cipher 544 may be based on a public-private key pair, where the corresponding public encryption key is used to encrypt the target data and the corresponding private encryption key is used to decrypt the target data.

Telemetry data manager 550 may include an interface protocol and/or set of functions, parameters, and/or data structures for receiving, parsing, storing, analyzing, and otherwise managing telemetry data messages from one or more storage devices. For example, telemetry data manager 550 may support one or more administrative command sets for telemetry data reporting and provide corresponding storage, aggregation, analysis, and presentation to a user or another system component. Telemetry data manager 550 may further include storage device communication protocols compatible with configuring and enabling secure telemetry messages from a storage device or one or more other hosts or clients.

In some embodiments, telemetry data manager 550 may include a plurality of hardware and/or software modules configured to use processor 512 and memory 514 to handle or manage defined operations of telemetry data manager 550. For example, telemetry data manager 550 may include a telemetry data receiver 552 configured to handle one or more command types for receiving telemetry messages from storage devices and/or other nodes. In some embodiments, telemetry data manager 550 may include a key manager 554 configured to manage one or more encryption keys for use in decrypting telemetry messages received by telemetry data receiver 552. In some embodiments, telemetry data manager 550 may include a message processor 556 configured to parse telemetry messages and store the telemetry data received from those messages. In some embodiments, telemetry data manager 550 may include telemetry data analytics 558 configured to analyze aggregate telemetry data for presentation and/or initiating automated management of storage devices and related storage system components and applications. In some embodiments, telemetry data manager 550 may include a user interface 560 configured to present telemetry data to a user through a graphical user interface and/or display of a user system, such as a client system.

Telemetry data receiver 552 may include an interface, such as a command interface or application protocol interface (API), for receiving telemetry messages from one or more storage devices. For example, telemetry data receiver 552 may include both NVMe compliant communication, command, and syntax functions, procedures, and data structures for receiving NVMe telemetry commands from storage devices and/or other nodes. In some embodiments, telemetry data receiver 552 may receive telemetry messages based on a telemetry header configured to route the telemetry command to a target node, such as a host or client system including telemetry data manager 550. Telemetry data receiver 552 may receive and identify a telemetry message and forward it to message processor 556 for processing.

In some embodiments, telemetry data manager 550 may be configured to handle secure telemetry messages that include one or more encrypted portions, such as encrypted telemetry data, table of contents, and/or sub-headers. Telemetry data manager 550 may include a key manager 554 configured to store at least one access control encryption key for use in accessing the telemetry data of the secure telemetry messages. For example, key manager 554 may include a private encryption key 554.1 corresponding to a public-private key pair, where the corresponding public encryption key was used by the storage device to encrypt at least a portion of the telemetry message. In some embodiments, private encryption key 554.1 may be used to decrypt an encrypted offload encryption key, table of contents, sub-header, and/or one or more data sections intended for selective access using private encryption key 554.1. For example, message processor 556 may retrieve private encryption key 554.1 from key manager 554 and provide it to encryption/decryption engine 540 for decrypting one or more portions of the telemetry message.

In some embodiments, message processor 556 may be configured to parse the telemetry message received by telemetry data receiver 552 and use encryption/decryption engine 540 to selectively decrypt relevant portions of the telemetry message using the corresponding encryption keys. For example, message processor 556 may receive an encrypted telemetry message from a telemetry command received by telemetry data receiver 552, process the encrypted telemetry message by decrypting relevant portions, and return telemetry data for use by telemetry data manager 550. In some embodiments, message processor 556 may include a mask, template, and/or logic for parsing specific portions of the telemetry message to read or extract desired fields or parameters. For example, message processor 556 may be configured to identify headers, sub-headers, table of contents, encryption keys, and one or more data portions including telemetry data from defined fields within the telemetry message.

In some embodiments, message processor 556 may include offload key logic 556.1 configured to determine an offload encryption key for use in decrypting one or more portions of the telemetry message. For example, offload key logic 556.1 may determine the location within the telemetry message containing a version of the offload encryption key that has been encrypted using the access control encryption key assigned to telemetry data manager 550. Offload key logic 556.1 may access private encryption key 554.1 from key manager 554 and use encryption/decryption engine 540 to decrypt the encrypted offload encryption key and return the decrypted offload encryption key. In some embodiments, offload key logic 556.1 may be configured to identify and decrypt multiple encryption keys from the telemetry message.

In some embodiments, message processor 556 may include header/table of contents logic 556.2 configured to determine one or more headers, table of contents, or other descriptive parameters for use in parsing the telemetry message. For example, header/table of contents logic 556.2 may determine the locations within the telemetry message containing headers, sub-headers, and at least one table of contents. In some embodiments, header/table of contents logic 556.2 may support encrypted header and/or table of contents data. For example, header/table of contents logic 556.2 may use an offload encryption key provided with the telemetry message and/or an encryption key stored in key manager 554 to decrypt the encrypted header or encrypted table of contents. In some embodiments, the telemetry message may include multiple headers and/or table of contents and header/table of contents logic 556.2 may identify the header and/or table of contents appropriate to the access privileges and/or access control encryption key assigned to telemetry data manager 550. In some embodiments, each table entry within a table of contents may include separate encryption to be selectively decrypted by nodes with appropriate access privileges, as described above with regard to FIG. 3, and header/table of contents logic 556.2 may be configured to parse individual table entries and determine appropriate encryption algorithms and keys for selectively invoking encryption/decryption engine 540.

In some embodiments, message processor 556 may include telemetry data logic 556.2 configured to determine one or more data sections containing telemetry data and store that telemetry data for use by telemetry data manager 550. For example, the table of contents in the telemetry message may define a plurality of data sections containing different portions of the telemetry data and telemetry data logic 556.2 may parse the values in the data sections, associate them with appropriate parameters or data types, and store them in a telemetry data store for aggregate use by telemetry data manager 550. In some embodiments, one or more data sections may be encrypted using one or more encryption algorithms and keys and telemetry data logic 556.2 may be configured to selectively invoke encryption/decryption engine 540 to decrypt encrypted telemetry data and return decrypted telemetry data. For example, the entire telemetry data payload may be encrypted using an offload encryption key provided with the telemetry message and/or one or more data sections may be encrypted using access control encryption keys. In some embodiments, telemetry data logic 556.2 may include a telemetry data table or other data structure for determining where received telemetry data is stored for further use.

Telemetry data analytics 558 may include or provide an interface to one or more data analytics tools or libraries for analyzing aggregate telemetry data received and stored by telemetry data manager 550. For example, telemetry data analytics 558 may include one or more analytical algorithms targeting aggregate operational data from one or more storage devices for monitoring performance, determining trends, and/or identifying events triggering further action or processing. In some embodiments, telemetry data analytics 558 may include a configurable set of user alerts for notifying a user or other system components when a notification threshold is reached. For example, an aggregate error rate threshold for a storage device and/or related change value may be compared to a threshold parameter value for generating a user alert that the device needs to be further monitored, maintained, and/or replaced. In some embodiments, telemetry data analytics 558 may be configured to aggregate operational parameters from the telemetry data across storage devices in one or more storage pools, arrays, or hierarchical configurations.

User interface 560 may be configured to provide a graphical user interface for displaying telemetry data and related analytics and navigation on a user device. For example, user interface 560 may display a graphical user interface for telemetry data manager 550 through a web browser or other application running on a personal computer, laptop computer, or mobile device to provide access to telemetry data manager 550. In some embodiments, user interface 560 may enable a user to navigate and display the aggregate telemetry data collected by telemetry data manager 550. For example, user interface 560 may enable a user to select telemetry data sets for display as data tables, charts, and/or other visualizations. User interface 560 may be configured to display derived data and parameters from the aggregate telemetry data, such as data determined by telemetry data analytics 558. In some embodiments, user interface 560 may also enable a user to manage configuration of telemetry data manager 550, such as selection of what storage devices are monitored, what telemetry data is collected, data collection triggers, alerts based on monitored telemetry data, etc.

Figure 6:
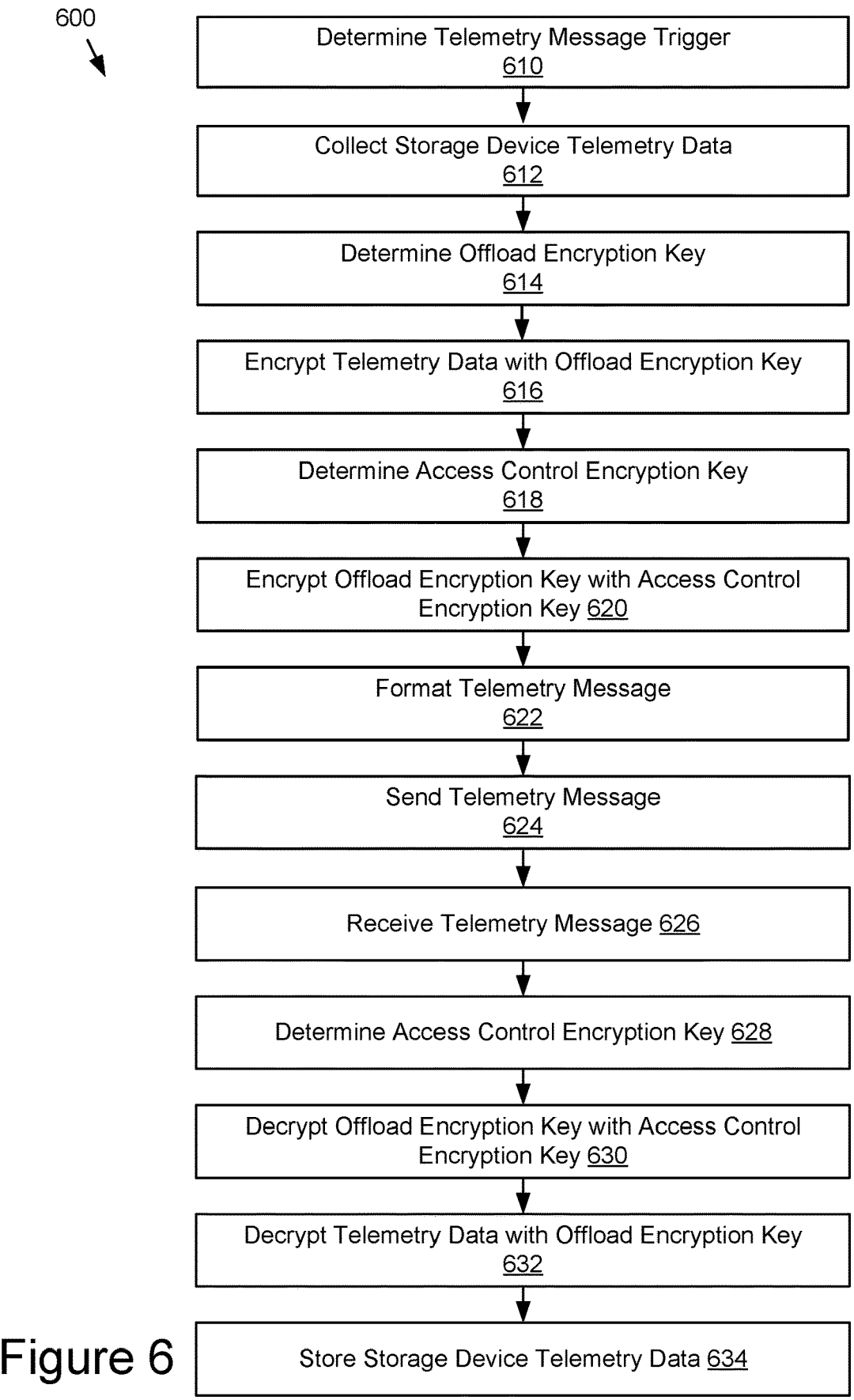
FIG. 6 is a flowchart of an example method of multi-layer encryption of telemetry data.

As shown in FIG. 6, storage system 500 may be operated according to an example method for multi-layer encryption of telemetry data in a telemetry message, i.e. according to method 600 illustrated by blocks 610-634 in FIG. 6.

At block 610, a telemetry message trigger may be determined. For example, a telemetry message handler in the storage device controller may determine that one or more rules-based triggers for collecting a telemetry data set and sending it to one or more hosts has been met.

At block 612, storage device telemetry data may be collected. For example, the telemetry message handler may determine one or more storage locations in the storage device for collecting telemetry data, such as workload data, error rates, log data, etc., and assemble a telemetry data set for the telemetry message.

At block 614, an offload encryption key may be determined. For example, the telemetry message handler may generate an offload encryption key to use for this telemetry message.

At block 616, the telemetry data may be encrypted using the offload encryption key. For example, the telemetry message handler may invoke an encryption engine to use a symmetric cipher encrypt the telemetry data using the offload encryption key.

At block 618, access control encryption keys may be determined. For example, the telemetry message handler may include one or more access control encryption keys, such as public keys associated with corresponding private keys controlled by one or more authorized entities.

At block 620, the offload encryption key may be encrypted using access control encryption keys. For example, the telemetry message handler may invoke the encryption engine to use an asymmetric cipher to encrypt the offload encryption key using the access control encryption keys.

At block 622, the telemetry message may be formatted. For example, the telemetry message handler may format the encrypted telemetry data and encrypted offload encryption key, as well as one or more headers, sub-headers, and/or tables of contents, according to a message format compatible with a telemetry command.

At block 624, the telemetry message may be sent. For example, the telemetry message handler may send the telemetry command using the corresponding storage interface protocols and target nodes for receiving the telemetry command.

At block 626, the telemetry message may be received. For example, one or more host or client systems including a telemetry data manager may receive the telemetry command from the storage device.

At block 628, an access control encryption key may be determined. For example, the telemetry data manager may include or access one or more access control encryption keys, such as private keys associated with corresponding public keys used to encrypt one or more portions of the telemetry message.

At block 630, the offload encryption key may be decrypted with the access control encryption key. For example, the telemetry data manager may invoke an encryption engine to use an asymmetric cipher to decrypt the encrypted offload encryption key using the access control encryption key and return the decrypted offload encryption key.

At block 632, the telemetry data may be decrypted with the offload encryption key. For example, the telemetry data manager may invoke the encryption engine to use a symmetric cipher to decrypt the encrypted telemetry data using the decrypted offload encryption key and return decrypted telemetry data.

At block 634, the telemetry data may be stored. For example, the telemetry data manager may store the decrypted telemetry data for future use by the host or client.

Figure 7:
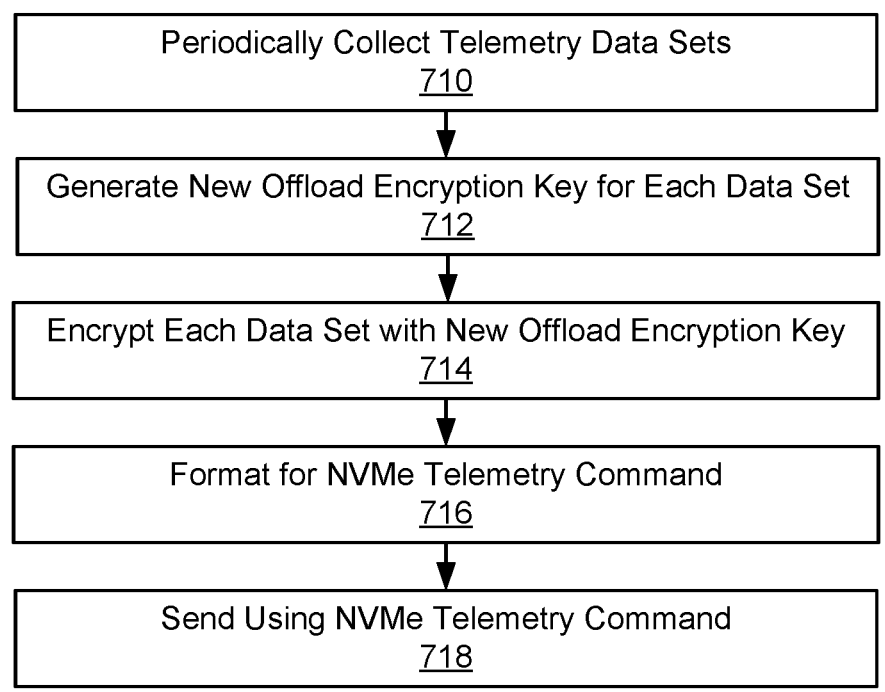
FIG. 7 is a flowchart of an example method of supporting periodic telemetry commands.

As shown in FIG. 7, storage system 500 may be operated according to an example method for supporting periodic telemetry commands, i.e. according to method 700 illustrated by blocks 710-718 in FIG. 7. In some embodiments, one or more blocks of method 700 may be used in conjunction with method 600 in FIG. 6.

At block 710, telemetry data sets may be periodically collected by a storage device. For example, the telemetry message handler in the storage device controller may evaluate periodic telemetry message triggers, such as reporting telemetry data at regular time-based intervals or based on one or more recurring trigger conditions.

At block 712, a new offload encryption key may be generated for each data set. For example, the telemetry message handler may include a key generator and generate a new offload encryption key for each telemetry message.

At block 714, each telemetry data set may be encrypted using a new offload encryption key. For example, as each telemetry data set is processed into a telemetry message, a new offload encryption key from block 712 may be used by an encryption engine to encrypt one or more sections the telemetry message.

At block 716, the telemetry message may be formatted in accordance with an NVMe telemetry command. For example, the telemetry message handler may format the telemetry message, including the encrypted telemetry data, to comply with the syntax, parameters, and protocols of an NVMe telemetry command.

At block 718, the telemetry message may be sent using the NVMe telemetry command. For example, the telemetry message handler may send the telemetry message to one or more NVMe host nodes using the NVMe telemetry command.

Figure 8:
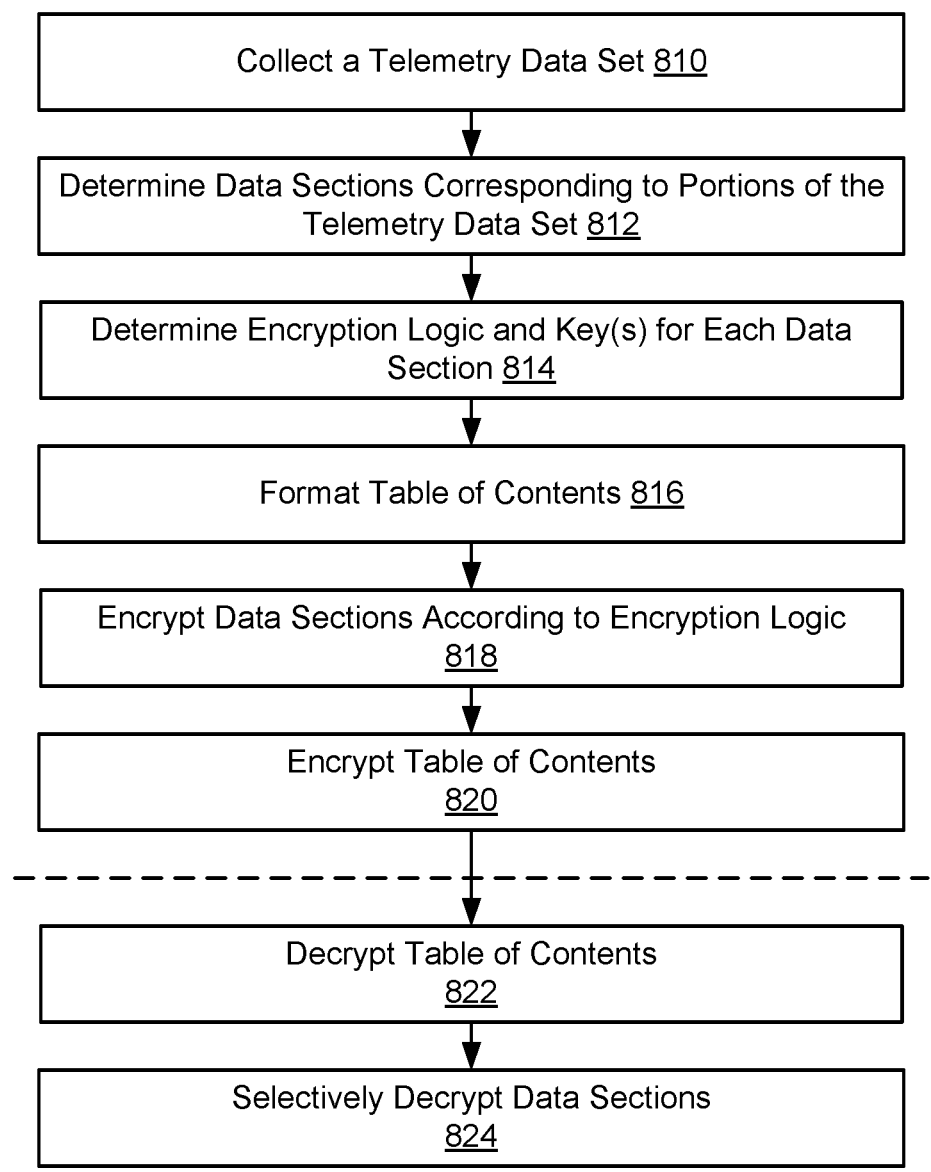
FIG. 8 is a flowchart of an example method of supporting multiple encrypted data sections within a telemetry message.

As shown in FIG. 8, storage system 500 may be operated according to an example method for supporting multiple encrypted data sections within a telemetry message, i.e. according to method 800 illustrated by blocks 810-824 in FIG. 8. In some embodiments, one or more blocks of method 700 may be used in conjunction with method 600 in FIG. 6.

At block 810, a telemetry data set may be collected. For example, a telemetry message handler in the storage device controller of a storage device may collect a set of telemetry data values, parameters, or logs for a telemetry message.

At block 812, data sections corresponding to portions of the telemetry data set may be determined. For example, the telemetry message handler may group telemetry data from the telemetry data set into a plurality of telemetry data portions corresponding to related parameters, time periods, source components or logs, etc. and allocate each portion to a corresponding data section in the telemetry message.

At block 814, encryption logic and/or encryption keys may be determined for each data section. For example, the telemetry message handler may include parameters for defining the data sections and associating each one with one or more sets of access credentials, such as encryption types or algorithms and encryption key information.

At block 816, a table of contents for the telemetry message may be formatted. For example, the telemetry message handler may include logic for assembling a table of contents indicating each of the data sections.

At block 818, data sections may be encrypted according to corresponding encryption logic. For example, the telemetry message handler may selectively invoke an encryption engine, indicating the cypher and encryption key to be used, for one or more secure telemetry data sections.

At block 820, the table of contents may be encrypted. For example, the telemetry message handler may encrypt the table of contents, such as using an offload encryption key or one or more access control encryption keys. Formatting of the telemetry message may be completed and the telemetry message may be sent from the storage device to one or more host or client systems authorized for selective access to one or more data sections in the telemetry message.

At block 822, the table of contents may be decrypted. For example, the host system receiving the telemetry message may include a telemetry data manager configured to parse the various fields in the telemetry message, identify and/or decrypt any needed offload encryption key, and decrypt the table of contents to identify the authorized data sections included in the telemetry message.

At block 824, one or more data sections may be selectively decrypted. For example, the telemetry data manager may use the information from the table of contents to determine one or more data sections for which it has the access authorization and corresponding encryption keys, then use the encryption engine and encryption keys to decrypt the authorized data sections.

Figure 9:
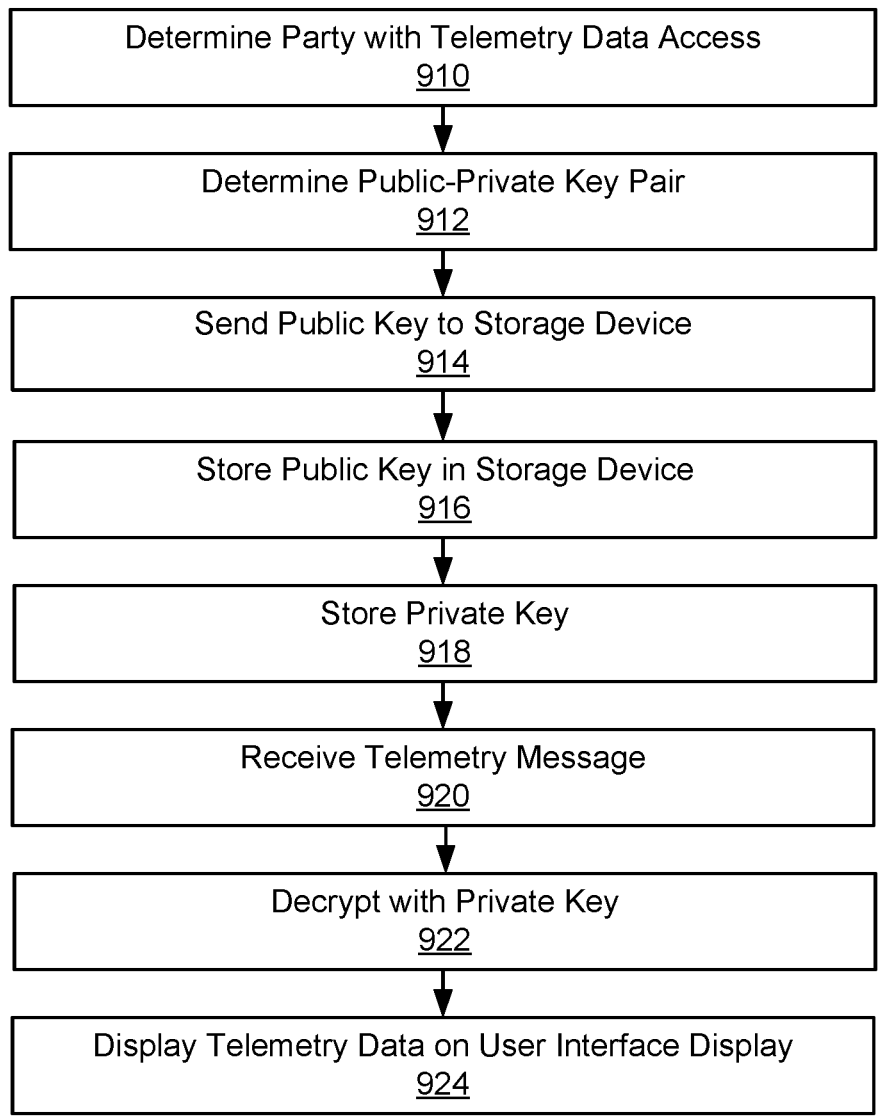
FIG. 9 is a flowchart of an example method of using public-private key pairs for different parties with access to the telemetry data.

As shown in FIG. 9, storage system 500 may be operated according to an example method for using public-private key pairs for different parties with access to the telemetry data, i.e. according to method 900 illustrated by blocks 910-924 in FIG. 9. In some embodiments, one or more blocks of method 700 may be used in conjunction with method 600 in FIG. 6.

At block 910, a party with telemetry data access may be determined. For example, a telemetry data manager in a host system belonging to an authorized party may be configured to receive secure telemetry messages from one or more storage devices.

At block 912, a public-private key pair may be determined. For example, the telemetry data manager may receive or generate a public-private key pair for an asymmetric cipher in an encryption engine accessible to the telemetry data manager.

At block 914, the public encryption key may be sent to one or more storage devices. For example, the telemetry data manager may send the public encryption key from the public-private key pair to the storage devices from which it will receive secure telemetry data.

At block 916, the public encryption key may be stored in the storage device. For example, the storage devices receiving the public encryption key may include a secure key manager for securely storing the public key for use in encrypting telemetry messages.

At block 918, the private key may be stored. For example, the telemetry data manager may include a secure key manager for securely storing the private key for use in decrypting telemetry messages.

At block 920, a telemetry message may be received. For example, the telemetry data manager may receive telemetry messages from the storage devices configured for secure telemetry messages.

At block 922, telemetry message contents may be decrypted with the private encryption key. For example, the telemetry data manager may use the private encryption key and an encryption engine with the corresponding asymmetric cipher to decrypt one or more portions of the secure telemetry message, such as an offload encryption key and/or sub-headers, tables of contents, and/or data sections intended solely for access using the private encryption key.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
   a processor;
   a memory;
   an encryption engine, stored in the memory for execution by the processor, configured to:
   receive storage device telemetry data;
   determine, from the storage device telemetry data, a first data section and a second data section;
   encrypt, using a first encryption key, the first data section of the storage device telemetry data;
   encrypt, using a encryption key, the second data section of the storage device telemetry data; and
   encrypt, using a third encryption key, the first encryption key and the second encryption key; and a message handler, stored in the memory for execution by the processor, configured to:
  format a telemetry message, wherein the telemetry message includes:
    the encrypted first data section of the storage device telemetry data;
    the encrypted second data section of the storage device telemetry data;
    the encrypted first encryption key and the encrypted second encryption key; and
    a table of contents configured to indicate encryption keys used to encrypt each data section of a plurality of data sections of the storage device telemetry data, including the first data section and the second data section; and
  send the telemetry message to a first client system configured to decrypt:
    the first encryption key from the encrypted first encryption key based on the third encryption key; and
    the first data section of the storage device telemetry data from the encrypted first data section of the storage device telemetry data.

2. The system of claim 1, wherein:
the encryption engine is further configured to encrypt, using a fourth encryption key, the first encryption key;
the telemetry message further includes the encrypted first encryption key based on the fourth encryption key; and
the message handler is further configured to send the telemetry message to a second client system configured to decrypt:
  the first encryption key from the encrypted first encryption key based on the fourth encryption key; and
  the first data section of the storage device telemetry data from the encrypted first data section of the storage device telemetry data.

3. The system of claim 1, wherein:
the first encryption key is a symmetric key;
the third encryption key is a public key of a public-private key pair; and
the first client system includes a private encryption key for the public-private key pair of the third encryption key.

4. The system of claim 1, further comprising a data storage device configured to:
periodically collect telemetry data sets; and
send each telemetry data set of a plurality of data sets to the encryption engine, wherein:
  the encryption engine is further configured to encrypt each telemetry data set; and
  the message handler is further configured to send each encrypted telemetry data set to the first client system.

5. The system of claim 4, wherein:
the data storage device includes:
  the processor;
  the memory;
  the encryption engine; and
  the message handler;
the data storage device is further configured to generate a new first encryption key for each telemetry data set; and
the encryption engine is further configured to encrypt each telemetry data set using a different first encryption key.

6. The system of claim 5, wherein:
the data storage device is further configured to use a non-volatile memory express (NVMe) storage protocol; and
the message handler is further configured to use an NVMe telemetry command to send the telemetry message.

7. The system of claim 1, wherein
the encryption engine is further configured to encrypt the table of contents.

8. The system of claim 1, wherein:
the telemetry message further includes a sub-header comprising vendor specific protocol requirements for the telemetry message; and
the encryption engine is further configured to encrypt the sub-header.

9. The system of claim 1, further comprising the first client system, wherein the first client system comprises:
a client processor;
a client memory;
a telemetry data manager, stored in the client memory for execution by the client processor, configured to:
  receive the telemetry message;
  determine the encrypted first data section of the storage device telemetry data; and
  determine the encrypted first encryption key based on the third encryption key; and
a decryption engine, stored in the client memory for execution by the client processor, configured to decrypt:
  the first encryption key from the encrypted first encryption key based on the third encryption key; and
  the first data section of the storage device telemetry data from the encrypted first data section of the storage device telemetry data.

10. The system of claim 9, wherein:
the telemetry data manager is further configured to:
  store a private encryption key from a public-private key pair for the third encryption key; and
  display the first data section of the storage device telemetry data on a user interface;
the storage device telemetry data includes at least one data type selected from:
  self-monitoring and reporting technology (SMART) data;
  non-volatile memory express (NVMe) data logs;
  dynamic storage device configuration data;
  event data logs;
  debug data;
  firmware management data;
  error data; and
  workload data; and
the decryption engine is further configured to use the private encryption key to decrypt the first encryption key from the encrypted first encryption key.

11. A computer-implemented method, comprising:
collecting storage device telemetry data;
determining, from the storage device telemetry data, a first data section and a second data section;
encrypting, using a first encryption key, the first data section of the storage device telemetry data;
encrypting, using a second encryption key, the second data section of the storage device telemetry data;
encrypting, using a third encryption key, the first encryption key and the second encryption key;
formatting a telemetry message, wherein the telemetry message includes:
  the encrypted first data section of the storage device telemetry data;

the encrypted second data section of the storage device telemetry data;

the encrypted first encryption key and the encrypted second encryption key; and a table of contents configured to indicate encryption keys used to encrypt each data section of a plurality of data sections of the storage device telemetry data, including the first data section and the second data section;

sending the telemetry message to a first client system;

receiving, by the first client system, the telemetry message;

decrypting, by the first client system, the first encryption key from the encrypted first encryption key based on the third encryption key; and decrypting, by the first client system, the first data section of the storage device telemetry data from the encrypted first data section of the storage device telemetry data.

12. The computer-implemented method of claim 11, further comprising:

encrypting, using a fourth encryption key, the first encryption key, wherein the telemetry message further includes the encrypted first encryption key based on the fourth encryption key;

sending the telemetry message to a second client system;

decrypting, by the second client system, the first encryption key from the encrypted first encryption key based on the fourth encryption key; and decrypting, by the second client system, the first data section of the storage device telemetry data from the encrypted first data section of the storage device telemetry data.

13. The computer-implemented method of claim 11, further comprising:

determining, by the first client system, a private encryption key for a public-private key pair of the third encryption key, wherein:

decrypting the first encryption key from the encrypted first encryption key uses the private encryption key;

the first encryption key is a symmetric key; and the third encryption key is a public key of the public-private key pair.

14. The computer-implemented method of claim 11, further comprising:

periodically collecting telemetry data sets;

encrypting each telemetry data set;

sending each encrypted telemetry data set to the first client system; and decrypting, by the first client system, each encrypted telemetry data set.

15. The computer-implemented method of claim 14, further comprising:

generating a new first encryption key for each telemetry data set; and encrypting each telemetry data set using a different first encryption key.

16. The computer-implemented method of claim 11, wherein:

collecting the storage device telemetry data includes collecting the storage device telemetry data from a storage device configured to use a non-volatile memory express (NVMe) storage protocol; and sending the telemetry message includes using an NVMe telemetry command.

17. The computer-implemented method of claim 11, further comprising:

encrypting the table of contents in the telemetry message.

18. The computer-implemented method of claim 17, further comprising:

encrypting a sub-header of telemetry message, wherein the telemetry message further includes the sub-header comprising vendor specific protocol requirements for the telemetry message.

19. The computer-implemented method of claim 11, further comprising:

storing, in the first client system, a private encryption key from a public-private key pair for the third encryption key, wherein decrypting the encrypted first encryption key includes using the private encryption key; and storing, in a data storage device, a public encryption key from the public-private key pair for the third encryption key, wherein encrypting the first encryption key includes using the public encryption key.

20. A storage system, comprising:

a data storage device comprising:

a storage device controller including a controller processor and a controller memory; and a storage medium;

a client system comprising:

a client processor; and a client memory;

means for collecting, from the data storage device, storage device telemetry data;

means for determining, from the storage device telemetry data, a first data section and a second data section;

means for encrypting, using a first encryption key, the first data section of the storage device telemetry data;

means for encrypting, using a second encryption key, the second data section of the storage device telemetry data;

means for encrypting, using a third encryption key, the first encryption key and the second encryption key;

means for formatting a telemetry message, wherein the telemetry message includes:

the encrypted first data section of the storage device telemetry data;

the encrypted second data section of the storage device telemetry data;

the encrypted first encryption key and the encrypted second encryption key; and a table of contents configured to indicate encryption keys used to encrypt each data section of a plurality of data sections of the storage device telemetry data, including the first data section and the second data section;

means for sending the telemetry message to the client system;

means for receiving, by the client system, the telemetry message;

means for decrypting, by the client system, the first encryption key from the encrypted first encryption key based on the third encryption key;

means for decrypting, by the client system, the first data section of the storage device telemetry data from the encrypted first data section of the storage device telemetry data; and means for displaying, by the client system, the first data section of the storage device telemetry data on a user interface.

* * * * *